United States Patent [19]

Carletti

[11] Patent Number: 5,094,563

[45] Date of Patent: Mar. 10, 1992

[54] SPACER FOR A FIXING TO A PANEL OF HOLLOW OR SANDWICH CONSTRUCTION

[75] Inventor: Ollivier Carletti, Vaux le Penil, France

[73] Assignee: Societe Nationale d'Etude et de Construction de Moteurs d'Aviation "S.N.E.C.M.A.", Paris, France

[21] Appl. No.: 649,060

[22] Filed: Feb. 1, 1991

[30] Foreign Application Priority Data

Feb. 2, 1990 [FR] France ............................. 90 01212

[51] Int. Cl.⁵ ............................................. F16B 09/00
[52] U.S. Cl. ................................ 403/194; 403/194; 403/195; 403/239; 403/372; 411/535; 411/546; 16/2
[58] Field of Search ............... 403/405.1, 406.1, 408.1, 403/365, 371, 194, 195, 238, 239, 372; 411/24, 25, 26, 546, 535; 16/2

[56] References Cited

U.S. PATENT DOCUMENTS

| | | | |
|---|---|---|---|
| 2,196,571 | 4/1940 | Van Gorden | 403/365 |
| 2,700,172 | 1/1955 | Rohe | 16/2 |
| 2,957,196 | 10/1960 | Kreider et al. | 411/546 X |
| 3,042,156 | 7/1962 | Rohe | 411/546 X |
| 4,131,379 | 12/1978 | Gordy et al. | 403/238 |
| 4,705,425 | 11/1987 | Okawa | 403/408.1 |
| 4,883,382 | 11/1989 | Mushya | 411/535 X |

FOREIGN PATENT DOCUMENTS

| | | |
|---|---|---|
| 0368723 | 5/1990 | European Pat. Off. ......... 403/408.1 |
| 1956356 | 10/1971 | Fed. Rep. of Germany ... 403/408.1 |
| 46406 | 6/1964 | France ................................... 411/24 |
| 2256687 | 7/1975 | France . |
| 2440485 | 5/1980 | France . |
| 861884 | 3/1961 | United Kingdom . |
| 885704 | 12/1961 | United Kingdom . |
| 1296758 | 11/1972 | United Kingdom . |

*Primary Examiner*—Randolph A. Reese
*Assistant Examiner*—Heather Chun
*Attorney, Agent, or Firm*—Oblon, Spivak, McClelland, Maier & Neustadt

[57] ABSTRACT

A device for use in fixing an element to a panel of sandwich or hollow construction comprising two parallel skins, the device acting as a spacer and comprising two bushes each having a plurality of circumferentially spaced fingers extending axially from a tubular part at one end of the bush, the bushes being placed head to tail in such a way that the fingers of each bush alternate with the fingers of the other. The free ends of the fingers of each bush spread outwards and act upon the inner face of the opposite skin, the tubular part of the bush being located in a hole of the respective skin and having an axial face forming a bearing surface for the fastening member or the element.

3 Claims, 2 Drawing Sheets

SPACER FOR A FIXING TO A PANEL OF HOLLOW OR SANDWICH CONSTRUCTION

BACKGROUND OF THE INVENTION

1. Field of the invention

The present invention relates to a device for use in fixing an element to a panel of hollow or sandwich construction by means of a fastening member, such as a screw or a pin or the like, which passes through the panel, said panel comprising two parallel skins which are spaced from each other and are provided with two aligned holes, one through each skin, through which the fastening member passes.

Box structures or sandwich-type panels to which it is necessary to fix elements firmly by screwing, pose fixing problems associated with the absence of material in the region between the two skins of such structures. Even if the element to be fixed to these structures has a surface wide enough to provide a bearing which avoids depression of the first skin in contact with the element, this does not apply to the second skin in contact with the screw fastener which, on tightening, will cause deformation of the skin, thus preventing achievement of a proper fastening. Furthermore, if the surface of the element bearing on the first skin is small, then both skins will be deformed. Accordingly, it is imperative to find a fixing device which enables a proper fastening for this type of structure to be achieved without undue deformation of the skins around the holes and without crushing the panel.

2. Summary of the prior art

It has already been proposed to use an annular spacer in such a manner that the axial faces of the spacer bear against the inner faces of the skins around the holes or are situated in the holes to operate directly as bearing surfaces for the fastening member and the element to be secured to the panel.

British Pat. No. 1296758 relates to a device comprising an annular spacer and two bushes sliding one inside the other and in the bore of the spacer, each bush comprising a flange surrounding the hole in the corresponding skin and engaging the outer face of this skin. The two holes in the skins have different sizes to permit the insertion of the spacer through the larger hole. The bushes have outer walls of conical shape which widen the ends of the spacer so that they come to be positioned at the periphery of the holes and near the inner faces of the skins. Also, the flanges have inner walls of conical shape intended to deform the periphery of the holes when the device is assembled, so that this periphery may adopt a conical shape and be interposed between the end face of the spacer and the inner face of the flange. This deformation of the periphery of the holes may cause a tearing of the skin in the vicinity of the holes, which is detrimental to the quality of the fastening. Moreover, the device involves three different parts with shapes matched in pairs and accurately formed so as to allow correct deformation of the spacer and the securing of the two bushes together after the device has been mounted in position.

French Patent Application No. FR-A-2 440 485 discloses a fixing device for a honeycomb panel wherein the axial faces of the spacer do not act on the inner faces of the skins. The spacer is held in place by two thin plates each provided with a hole having its edge adapted to the corresponding end of the spacer, the said plates being fixed by adhesive on the outer faces of the skins. In this arrangement nothing prevents a crushing or coming closer together of the skins in the vicinity of the holes.

French Patent Application FR-A-2 256 687 also relates to a fixing device for a panel of sandwich construction, the device comprising a spacer of cylindrical form which is inserted between the skins through a larger size hole in one of the skins, and the end faces of which come to act against the inner faces of the skins as a consequence of deformation of the spacer under the action of a pin or rivet fitted with a cylindrical portion designed to expand the spacer. This arrangement requires riveting means for it to be used.

SUMMARY OF THE INVENTION

The aim of the present invention is to avoid the drawbacks mentioned above and to provide a low cost spacer device which is simple to use and prevents any deformation of the skins in the vicinity of the holes.

To this end, according to the invention, there is provided a device for use in fixing an element to a panel of hollow or sandwich construction by means of a fastening member which passes through the panel, said panel comprising two parallel skins which are spaced from each other and are provided with two aligned holes, one through each skin, through which the fastening member passes, said device comprising a pair of similar bushes, each bush comprising a tubular part having a first axially facing face defining one end of the tubular part and of the bush and a second axially facing face at the opposite end of the tubular part, and a plurality of fingers which extend substantially axially from the second axially facing face of the tubular part, the fingers having free ends capable of being displaced in an outward direction and defining the other end of the bush, and the fingers being circumferentially spaced apart to define slots therebetween such that the fingers of each bush will fit into the slots of the other bush, thereby alternating with the fingers of the other bush, when the two bushes are placed coaxially together head to tail with the tubular parts thereof at opposite ends from each other, the device, in use, being mounted so that the bushes are in said head to tail relationship within the panel and the tubular parts of the bushes are located in respective ones of the holes in the skins of the panel, the fastening member passing through the bushes, and the dimensions of each bush being such that the tubular part thereof fits within the respective hole and has an axial length greater than the thickness of the respective skin of the panel, and such that, when the element has been fastened to the panel, the first axially facing face of the tubular part lies substantially flush with the outer face of the respective skin, and the free ends of the fingers are displaced outwardly of the tubular part of the other bush and bear against the inner face of the opposite skin around the hole in which the tubular part of the other bush is located.

Preferably, each bush has means for deflecting the free ends of the fingers of the other bush outwards when the two bushes are placed in said head to tail relationship and are moved further together in an axial direction.

Advantageously, the deflecting means may comprise inclined surfaces provided on the second axially facing face of the tubular part at the base of the slots.

With the construction defined, the two interleaved bushes form a spacer acting at one and the same time as a support for the fastening member and for the fastened element, as well as for the skins themselves through the ends of the fingers acting on the inner faces of the skins.

When the two skins are of the same thickness, the two bushes may be identical so as to reduce costs. The holes in the skins may also, in this case, be of the same size.

Other characteristics and advantages of the invention will become apparent from the following description of various embodiments of the invention with reference to the attached drawings.

DESCRIPTION OF THE PREFERRED EMBODIMENTS

Figure 1:
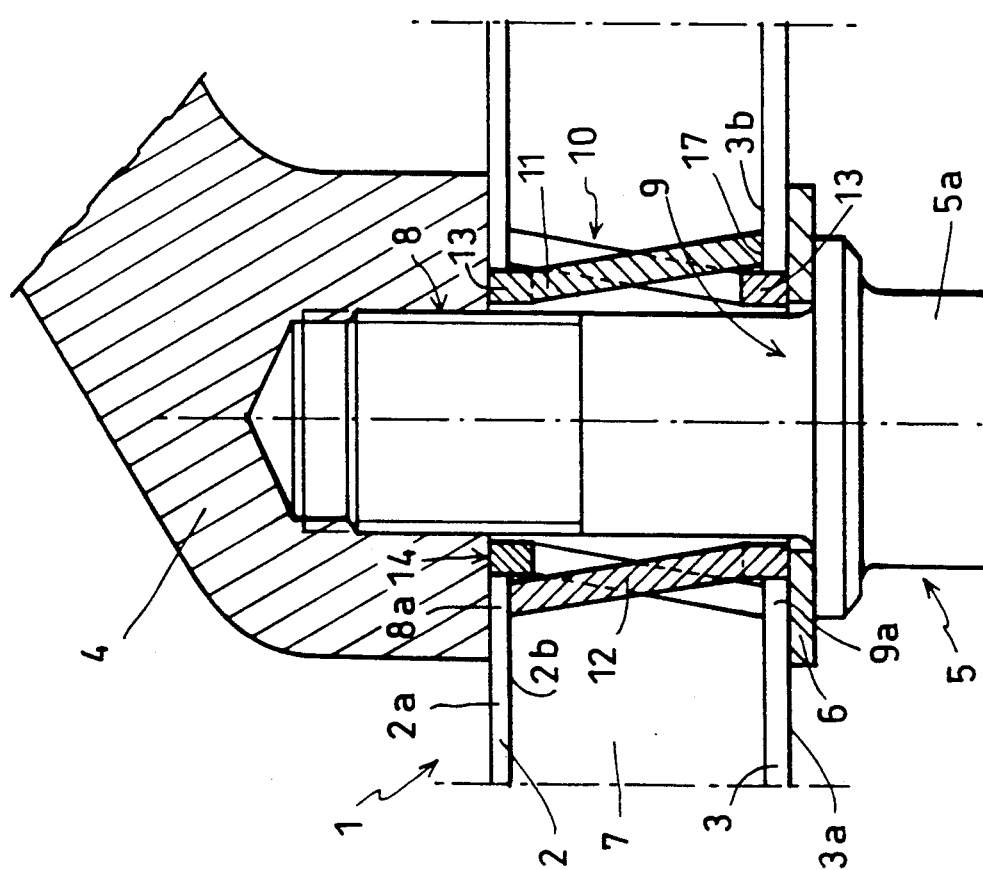
FIG. 1 is a section through one example of a spacer device of the invention as used in fastening an element to a panel.

FIG. 1 shows a panel 1 of hollow or sandwich construction which comprises two parallel skins 2 and 3, and on which an element 4 is fastened using a fastening member 5 passing through the panel 1 and engaging with the element 4. The member 5 may be a screw having a head 5a which acts upon the outer face 3a of the skin 3. Similarly, the fastened element 4 has a face in contact with the outer wall 2a of the skin 2. When the surface of either the element 4 or the screw head 5a in contact with the outer face 2a,3a of the skin 2,3 is of small size, a washer may be placed between the said part and the corresponding skin, such as shown at 6 between the screw head 5a and the skin 3.

The space 7 within the panel 1 between the two skins 2 and 3 may be hollow (as shown) or filled with a highly compressible, low density material.

The fastening member 5 passes through the panel 1 via two holes 8,9 provided in the skins 2 and 3 respectively. These holes 8 and 9 place the space 7 in communication with the outside when the said space 7 is hollow. When the space 7 is filled with a low density material, the holes 8 and 9 define the openings of a cylindrical passage passing through the panel 1.

In order to prevent crushing of the panel 1 in the vicinity of the holes 8 and 9 when forces are exerted on the fastening member 5, a fixing device 10 is provided which comprises a first bush 11 forming a spacer between the fastened element 4 and the inner face 3b of the skin 3, and a second bush 12 forming a spacer between the screw head 5a and the inner face 2b of the skin 2.

Figure 3:
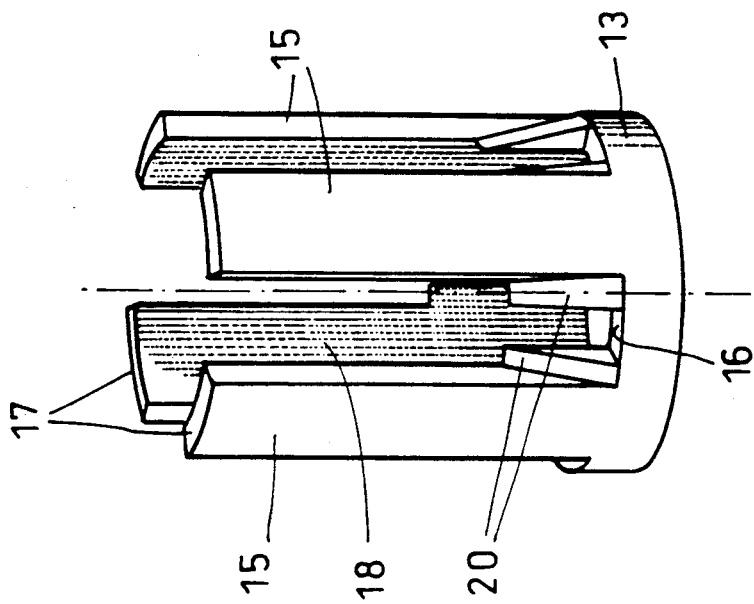
FIG. 3 is a perspective view of one of the bushes used to form the spacer device shown in FIG. 1.

As will be seen more clearly in FIG. 3, the first and second spacer bushes 11,12, which are preferably identical, each have a tubular part 13 at one end having a first axial face 14 constituting a bearing surface for the fastening member 5 or the fastened element 4, and a plurality of circumferentially spaced fingers 15 at the other end extending axially from a second axial face 16 of the tubular part 13 remote from the first axial face 14, the fingers 15 having free ends 17 which are able to move apart in an outward direction. The fingers 15 alternate with axial slots 18 which are dimensioned so that the fingers of each bush 11,12 can be fitted into the slots 18 of the other bush 12,11 when the two bushes are placed coaxially together in a head to tail arrangement such that their first axial faces 14 are at opposite ends, the fingers 15 of the bush 11 then alternating with the fingers 15 of the other bush 12.

Figure 2:
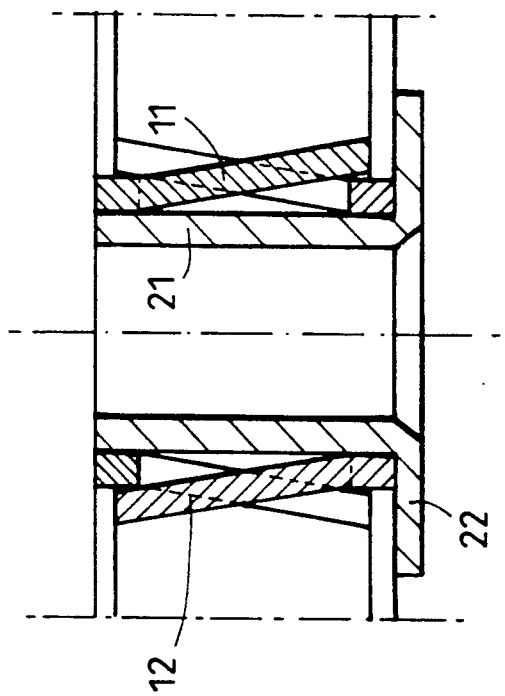
FIG. 2 is a sectional view of an alternative form of the spacer device illustrated in FIG. 1.

As will be seen clearly in the drawings, and particularly in FIGS. 1 and 2, the two bushes 11 and 12 are mounted head to tail in the space 7 of the panel, and in such a manner that the tubular parts 13 are located in the holes 8 and 9.

The dimensions of each tubular part 13 are such that its cross-section matches the section of the corresponding hole 8 or 9, and its bore is able to receive, with some clearance, the shank of the fastening member 5. Also, the length of the tubular part 13 is slightly greater than the thickness of the corresponding skin 2 or 3. The length of each bush 11,12 is substantially equal to the thickness of the panel 1 less the thickness of the skin remote from its tubular part.

As a result of dimensioning the bushes in this way the free ends 17 of the fingers 15 of each bush 11,12, in use, become located outside the tubular part 13 of the other bush 12,11 and act upon the inner wall of the opposite skin 3,2.

The portion of skin 8a surrounding the hole 8 is thus interposed between the fastened element 4 and the ends 17 of the fingers 15 of the bush 12. Similarly, the portion of skin 9a surrounding the hole 9 is located between the screw head 5a or the washer 6 and the ends 17 of the fingers 15 of the bush 11.

Figure 4:
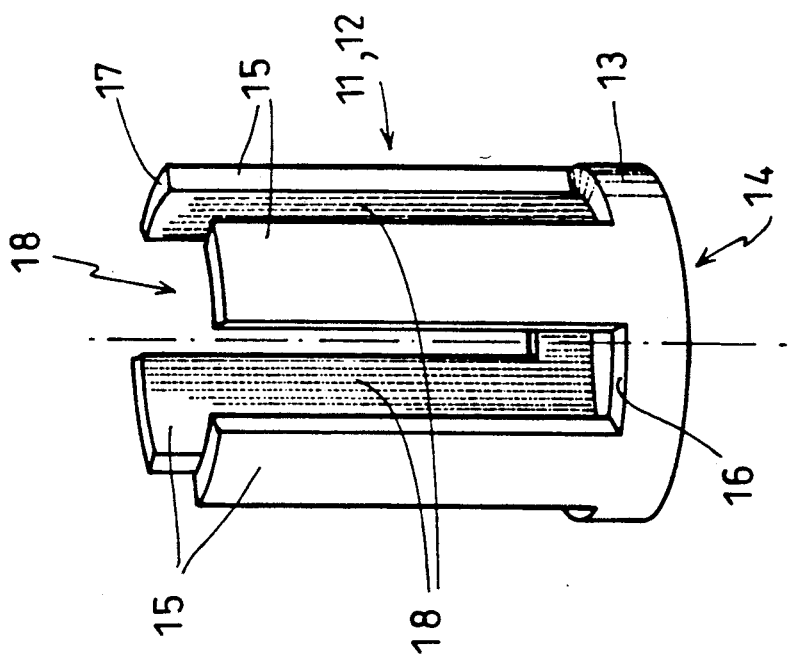
FIG. 4 is a perspective view of a preferred alternative construction of the bush shown in FIG. 3.

FIG. 4 shows a preferred construction for the bushes 11 and 12. In this construction inclined walls or ramps 20 are provided on the second axial face 16 of the tubular part 13 at the level of the slots 18 adjacent the tubular part 13. These inclined walls 20 are intended to engage and deflect outwards the ends 17 of the fingers 15 of the other bush when one presents and moves together the two bushes head to tail.

FIG. 2 shows an alternative form of the spacer device of the invention in which a cylindrical liner 21 is placed between the shank of the fastening member 5 (not shown in FIG. 2) and the two head-to-tail bushes 11 and 12. This liner 21 may have an annular flange 22 at one of its ends to replace the washer 6 shown in FIG. 1.

The mounting of the spacer device 10 does not require any special tool other than the tightening tool for the fastening member 5. The two bushes 11 and 12 are presented coaxially head to tail, so that the fingers 15 of the bush 11 alternate with the fingers of the bush 12 to form a substantially cylindrical sleeve, and this sleeve is introduced into the holes 8 and 9 after having placed it around the shank of the fastening member. The screwing of the fastening member 5 to the element 4 to be fastened to the panel 1 brings the screw head 5a closer to the element 4, and hence moves the two tubular parts 13 of the bushes 11,12 closer together. The consequence of this is a spreading apart of the ends 17 of the fingers 15 by cooperation of these ends 17 with the inclined surfaces 20 of the other bush. The ends 17 of the fingers 15 thus come to act on the respective inner face 2a,3a of the skins 2 and 3.

In the above described embodiments the two bushes 11 and 12 are identical and the holes 8 and 9, which are preferably circular, are of the same size. However, it will be obvious that the invention is not restricted to this particular arrangement. Furthermore, the number of fingers 15 on each bush may be more or less than four as shown in the drawings. What is important is that the number of fingers 15 should be the same on each of the two bushes 11 and 12.

I claim:

1. A device for use in fixing an element to a panel of hollow or sandwich construction by means of a fastening member which passes through the panel, said panel comprising two parallel skins which are spaced from each other and are provided with two aligned holes, one through each skin, through which said fastening member passes, said device comprising a pair of similar bushes, each bush comprising a tubular part having a first axially facing face defining one end of said tubular part and of said bush and a second axially facing face at the opposite end of said tubular part, and a plurality of fingers which extend substantially axially from said second axially facing face of said tubular part, said fingers having free ends capable of being displaced in an outward direction and defining the other end of said bush, and said fingers being circumferentially spaced apart to define slots therebetween such that said fingers of each bush will fit into said slots of the other bush, thereby alternating with said fingers of said other bush, when the two bushes are placed coaxially together head to tail with said tubular parts thereof at opposite ends from each other, said device, in use, being mounted so that said bushes are in said head to tail relationship within said panel and said tubular parts of said bushes are located in respective ones of said holes in said skins of said panel, said fastening member passing through said bushes, and the dimensions of each bush being such that said tubular part thereof fits within the respective hole and has an axial length greater than the thickness of the respective skin of said panel, and such that, when said element has been fastened to said panel, said first axially facing face of said tubular part lies substantially flush with the outer face of the respective skin, and said free ends of said fingers are displaced outwardly of said tubular part of said other bush and bear against the inner face of the opposite skin around said hole in which said tubular part of said other bush is located.

2. A device according to claim 1, wherein each said bush includes means for deflecting said free ends of said fingers of said other bush outwards when said two bushes are placed in said head to tail relationship and are moved further together in an axial direction.

3. A device according to claim 2, wherein said deflecting means comprise inclined surfaces provided on said second axially facing face of said tubular part at the base of said slots.

* * * * *